United States Patent [19]

Mooney

[11] 4,186,591
[45] Feb. 5, 1980

[54] DEVICE FOR AND METHOD OF DETECTING LEAKS IN A LIQUID STORAGE RESERVOIR

[76] Inventor: Joseph R. Mooney, 33 Hawk St., New Orleans, La. 70124

[21] Appl. No.: 964,088

[22] Filed: Nov. 27, 1978

[51] Int. Cl.² ............................................ G01M 3/32
[52] U.S. Cl. .................................... 73/49.2; 73/292
[58] Field of Search ......................... 73/49.2, 292, 322

[56] References Cited

U.S. PATENT DOCUMENTS

| | | | |
|---|---|---|---|
| 1,417,892 | 5/1922 | Ehrentraut | 73/292 |
| 1,777,415 | 10/1930 | Morgan | 73/292 |
| 2,677,276 | 5/1954 | Schmidt | 73/292 |
| 2,902,859 | 9/1959 | Quist | 73/292 X |
| 3,359,799 | 12/1967 | Lubin | 73/322 X |
| 3,580,055 | 5/1971 | White | 73/292 X |
| 3,841,146 | 10/1974 | Cross et al. | 73/49.2 |

FOREIGN PATENT DOCUMENTS

| | | | |
|---|---|---|---|
| 597699 | 9/1925 | France | 73/292 |
| 45-20837 | 7/1970 | Japan | 73/292 |
| 151500 | 2/1962 | U.S.S.R. | 73/292 |

Primary Examiner—Gerald Goldberg
Assistant Examiner—Joseph W. Roskos
Attorney, Agent, or Firm—John R. Walker, III

[57] ABSTRACT

An underground storage tank is filled with liquid (e.g., gasoline) until the level of the liquid in the tank rises into the fill-pipe leading from the surface of the ground to interior of the tank. A buoyant member is floated on the surface of the liquid in the fill-pipe. The height of the buoyant members and the temperature of the liquid within the tank are monitored over a period of time. Any fall of the buoyant member that is not proportional to any change of temperature of the liquid within the tank indicates a leak in the tank.

9 Claims, 5 Drawing Figures

DEVICE FOR AND METHOD OF DETECTING LEAKS IN A LIQUID STORAGE RESERVOIR

BACKGROUND OF THE INVENTION

1. Field of the Invention

This invention relates generally to tanks for storing gasoline, oil and other liquids and more specifically to devices for the methods of detecting leaks in such tanks.

2. Description of the Prior Art

Heretofore, a number of procedures and devices have been used to detect leaks in underground liquid storage reservoirs. One method commonly utilized in petroleum products service stations is to: (1) plug all but one opening in the tank being tested, (2) connect a "stand pipe" to the one unplugged opening (an existing vent riser is sometimes used as this "stand pipe"), and (3) fill the tank more than the normal maximum amount and until the level of liquid in the tank rises into the "stand pipe" usually to a height of several feet above ground level. If the liquid continues to drop in the "stand pipe" it is assumed that there might be a leak in the system, that is, in the tank itself or in the "stand pipe" itself. Among the factors which must be taken into consideration using this method are: the inaccuracies caused by the bulging of the tank, particularly the tank ends, due to the high static pressures within the tank that are greater than those normally imposed upon the tank due to the height of the liquid in the "stand pipe", the labor time involved in uncovering and plugging the opening; and the excessive down time and loss of use of the tank. Another test commonly used consists of: (1) filling the tank with liquid, (2) plugging all but one opening in the tank, (3) pressurizing the interior of the tank with air through the one unplugged opening, (4) then plugging the one unplugged opening, and (5) monitoring the air pressure within the tank. If the air pressure within the tank drops, it is assumed that there might be a leak in the system. Many variables such as changes in volume of the air and liquid due to changes in temperature make it difficult to determine conclusively the existence of relatively small leaks in the tank such as the 1.2 gallon per day leakage presently considered by the National Fire Protection Association (NFPA) to be tolerable.

The following U.S. Pat. Nos. disclose various liquid level gauges and the like: Pap, 1,072,642; Pitkin, 1,381,005; Whitehead, 2,625,820; Harper, 2,653,478; Hoferer, 3,023,620; Kapff, 3,537,298; Wright, 3,538,745; Jacobs, 3,538,746; and Ward, 3,857,358. None of the above patents disclose or suggest the present invention. It should be noted the U.S. Pat. No. 3,537,298 discloses an apparatus for detecting leakage in tanks containing fluids which utilizes a thermistor to detect flow of fluid.

SUMMARY OF THE INVENTION

The present invention is directed towards improving upon prior devices for and methods of detecting leaks in liquid storage reservoirs. The concept of the present invention is to fill a liquid storage reservoir with liquids until the level of the liquid rises into any upwardly extended tube member which communicates with the interior of the reservoir (the tube member is preferably a standard part of the reservoir piping, e.g., the fill pipe, rather than a device added to the system just for use in the test for leaks), measuring any change in the level of liquid in the tube member over a period of time, and measuring any change in the temperature of the liquid in the reservoir over the same period of time. A float means is utilized to float on the surface of the liquid in the tube member for indicating any change in the level of the liquid in the reservoir over a certain period of time. A temperature sensing means is utilized to indicate any change in temperature of the liquid in the reservoir over the same period of time.

The overall objective of the present invention is to provide a more accurate, faster and more certain method of determining the integrity of a storage tank with relatively simple equipment and simpler procedures than those now in use.

Leakage of valuable and/or hazardous liquids from storage tanks is an ever increasing problem. This is particularly true in situations in which such leaks are not easily detectable by visual inspections, as, for example, in underground storage reservoirs for petroleum products (in commercial service stations, private auto and truck fleet fueling installations, petroleum bulk storage plants, etc.).

While the present invention is particularly useful relative to such underground storage tanks, it can be used in any situation involving leakage of liquid from a tank, especially when such leakage cannot be readily detected by visual inspection. The NFPA considers a leakage rate of 1.2 gallons per day per tank in a gasoline service station as tolerable. Thus, if a service station has three tanks and each tank is leaking at a rate of 1 gallon per day for a total of almost 1100 gallons per year, the situation would be acceptable by NFPA standards. One reason for such tolerant standards is the difficulty in determining whether or not small leaks exist and determining the actual leakage rates. In some specific areas of importance, for example, in gasoline service stations and pertroleum bulk storage plants having underground tanks, there are difficulties in accurately measuring a loss of a gallon of product because of complicating factors such as temperature changes and the like. For example, an average change of one degree Fahrenheit in a fluid reservoir containing 10,000 gallons of gasoline would result in a volume change of 6 gallons. Thus, a need for efficient leak detection methods and equipment for underground storage tanks is obvious from the standpoint of environment protection, economics (relates to losses of valuable products as well as cost of damage), and energy conservation.

DESCRIPTION OF THE PREFERRED EMBODIMENT

Figure 1:
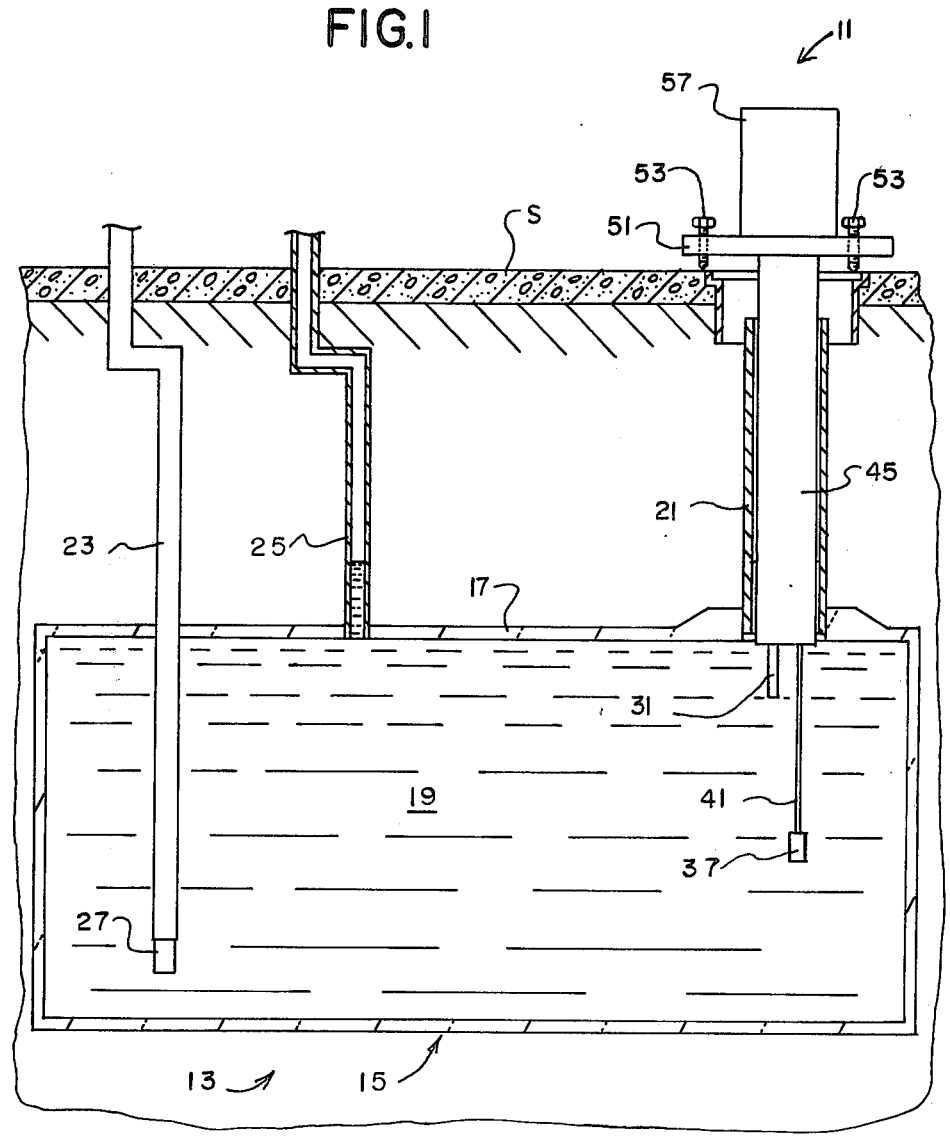
FIG. 1 is a side elevational view of the device for detecting leaks in a liquid storage tank of the present invention shown coupled to a sectionalized liquid storage tank.
Figure 2:
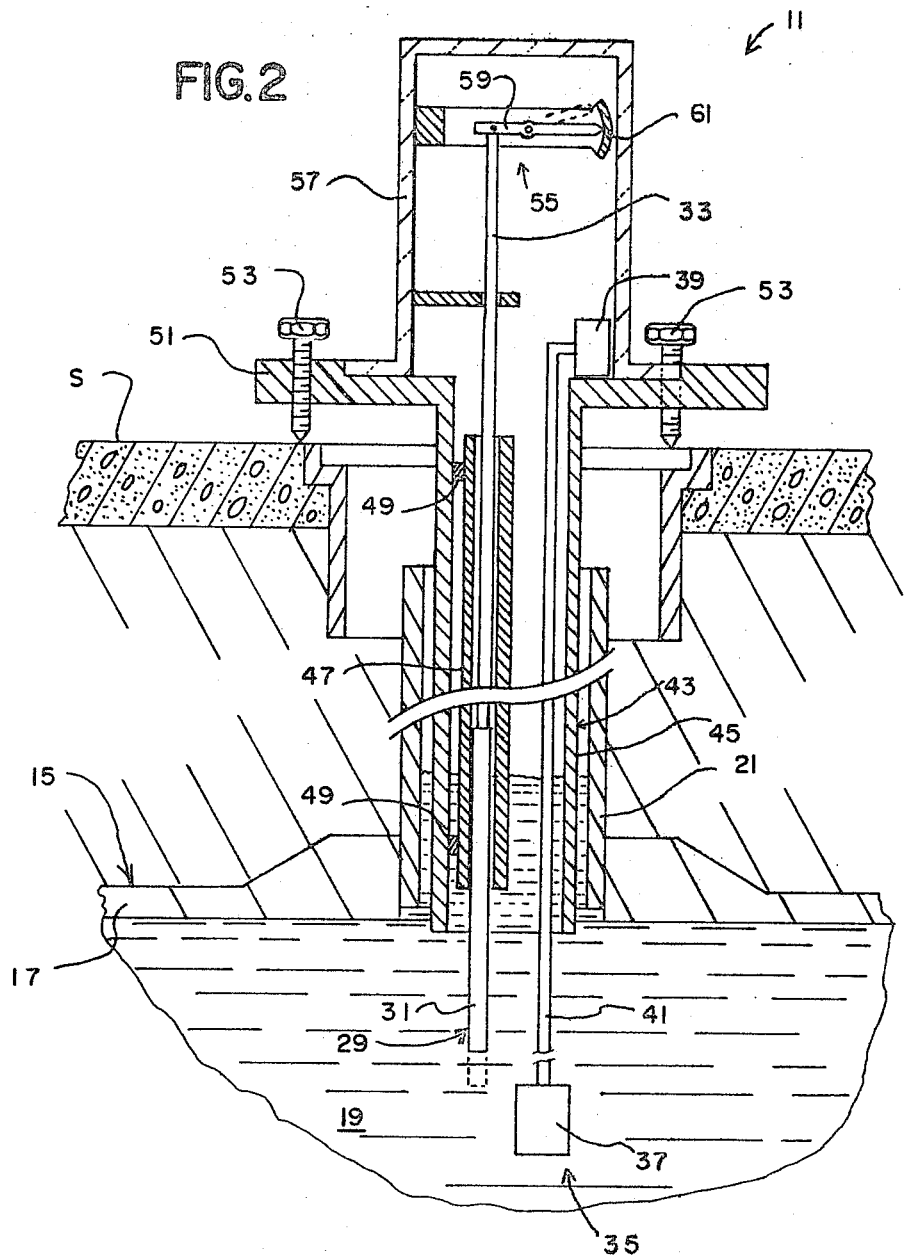
FIG. 2 is an enlarged view of a portion of FIG. 1 showing portions of the device broken away to display the interior thereof.
Figure 3:
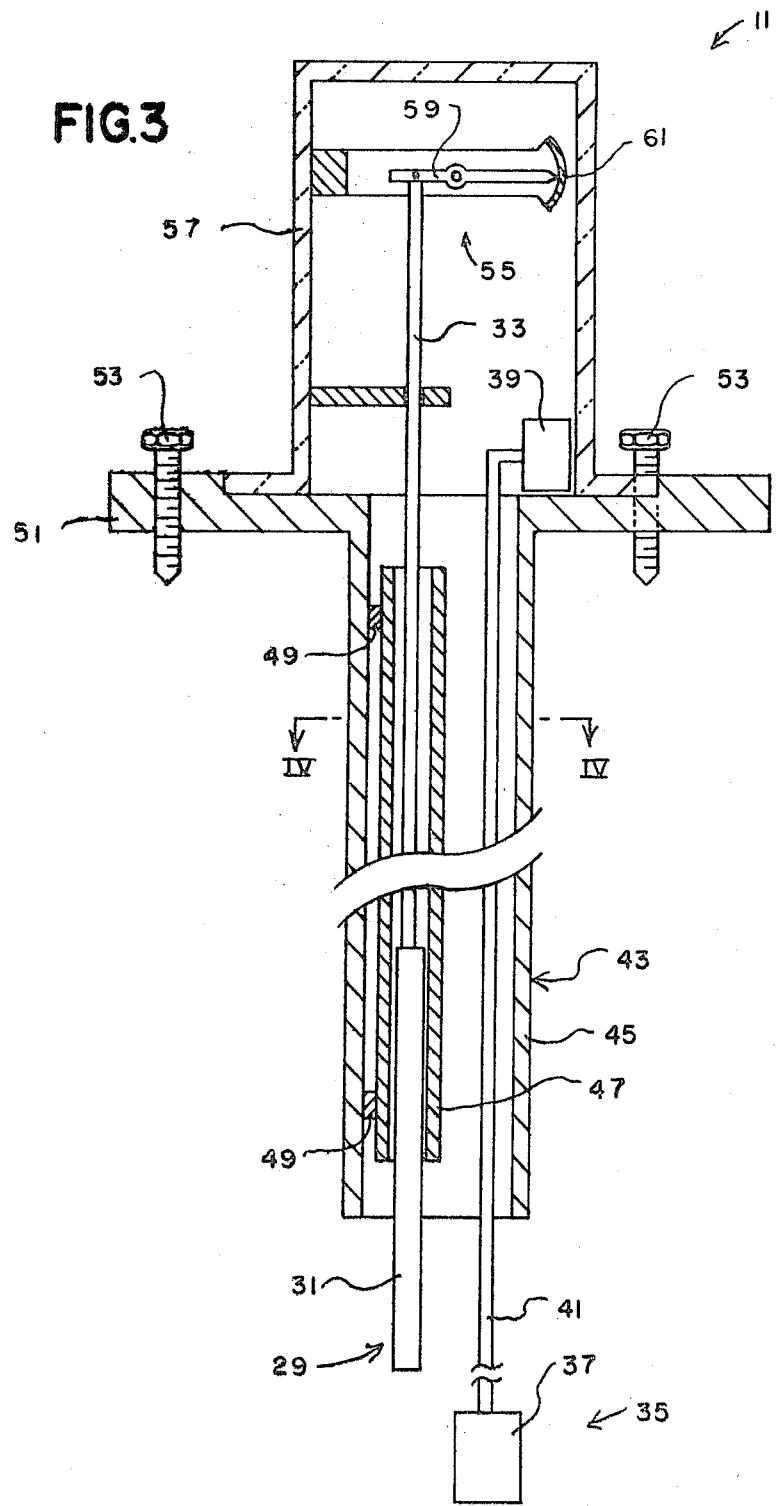
FIG. 3 is a sectional view of the device of the present invention.
Figure 4:
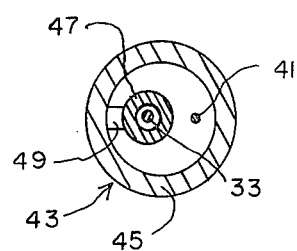
FIG. 4 is a sectional view as taken on line IV—IV of FIG. 3.
Figure 5:
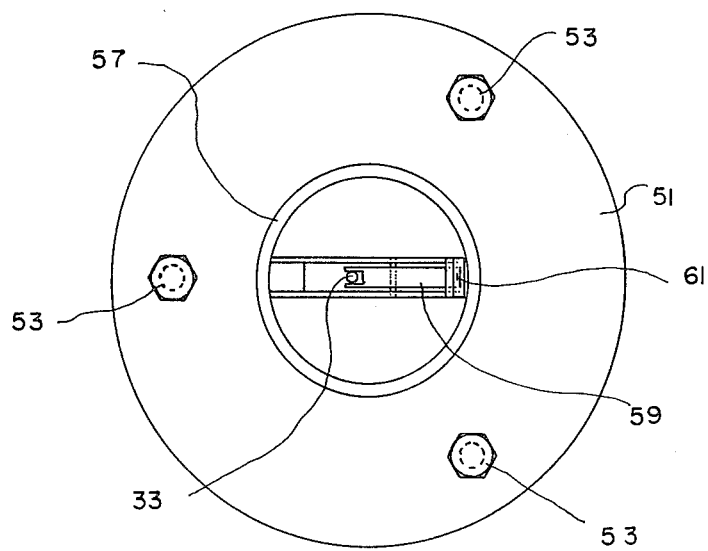
FIG. 5 is a top plan view of the device of the present invention.

The device 11 of the present invention is for use in detecting leaks in liquid storage reservoirs 13 of the type including a hollow tank 15 having a top portion 17, and including at least one hollow tube member extending upwardly above the top portion 17 of the tank 15 and communicating with the interior 19 of the tank 15. The reservoir 13 may include a first hollow tube member 21 extending upwardly from the top portion 17 of the tank 15 for allowing the tank 15 to be filled with liquid such as gasoline, a second hollow tube member 23 communicating with the interior of the tank 15 for allowing liquid such as gasoline to be pumped from the tank 15, and a third hollow tube member 25 communicating with the interior of the tank 15 for allowing air and vapors to enter and exit the interior 19 of the tank 15. A submersible pump 27 may be attached to the end of the second hollow tube 23 within the interior 19 of the tank 15 for pumping liquid such as gasoline through the second tube member 23. The reservoir 13 may be of the type positioned below the surface S of the ground.

The device 11 includes a float means 29 for floating partially submerged in the liquid in one of the hollow tube members of the reservoir 13 and for indicating any change in the level of the liquid in the tube member 20 over a period of time. The float means 29 preferably includes a buoyant member 31 for floating partially submerged in the liquid in the first tube member 21 and preferably includes an upwardly extended gauge portion 33 fixedly attached to and extending upwardly of the buoyant member 31. The float means 29 may be constructed of any material and in any manner which should now be apparent to those skilled in the art.

The device 11 also includes temperature sensing means 35 for indicating any change in temperature of the liquid in the reservoir 13 over the same period of time that the float means 29 indicates any change in the level of liquid in the tube member 21. The temperature sensing means 35 may be of any type which should now be apparent to those skilled in the art. For example, the temperature sensing means 35 may include one or more thermistor elements 37 (only one being shown) for being positioned in the interior 19 of the tank 15 and a control element 39 electrically coupled to the thermistor element 37 by an electrical conductor means 41. The control element 39 includes a source of electrical power and means for measuring and indicating the amount of electrical power or the like passing through the thermistor element or elements 37 to thereby indicate the temperature of the liquid in the reservoir 13 as will be apparent to those skilled in the art.

The device 11 may include a guide sleeve means 43 for being positioned within the tube member 21 to restrict any side-to-side movement of the float means 29 and to reduce the cross-sectional area of the tube member 21. It should be noted that the combined cross-sectional areas of the tube members 21, 23, 25 are less than the cross-sectional area of the tank 15. Thus, any change in the level of liquid in the reservoir will be more apparent in the tube members 21, 23, 25 than in tank 15 since a loss of, for example, one gallon of liquid will cause a greater drop in the level of the liquid in the tube members 21, 23, 25 than it would in the level of the liquid in the tank 15 if the tank 15 was only partially filled as in, for example, the U.S. Pat. No. 3,537,298. By further reducing the cross-sectional area of the tube member 21 with the guide sleeve means 43, any change in the level of liquid in the tube member 21 will become even more apparent. The guide sleeve means 43 preferably includes an outer sleeve member 45 for loosely fitting into the tube member 21 and an inner sleeve member 47 positioned within the outer sleeve 45. The inner sleeve member 47 is preferably fixedly attached to the outer sleeve member 45 by way of welds 49 or the like. The float means 29 is slidably positioned within the inner sleeve member 47 and the inner sleeve member 47 acts to provide lateral stability for the float means 29 and protect the float means 29 from being struck and/or moved by other components, such as temperature detectors or the like being lowered into the tank 15 through the tube member 21. The inner sleeve member 47 is preferably substantially smaller than the outer sleeve member 45 and attached to one side of the outer sleeve member 45 to allow other components such as the thermistor element 37 to be lowered into the interior 19 of the tank 15 through the outer sleeve member 45. A flange member 51 is preferably attached to the upper end of the outer sleeve member 45 for supporting the guide sleeve means 43 on the surface S of the ground. A plurality of screw members 53 preferably extend through the flange member 51 to allow the guide sleeve means 43 to be leveled or plumbed relative to the tube member 21 in a manner which should now be apparent to those skilled in the art.

The gauge portion 33 of the float means 29 extends above the upper end of the guide sleeve means 43 when the buoyant member 31 is floating upon the surface of the liquid in the tube member 21 thereby allowing any change in the level of the liquid in the reservoir 13 to be measured by measuring any rise or fall of the gauge portion 33 relative to surface S of the ground or the top of the guide sleeve means 43 or the like.

The device 11 may include multiplying means 55 for multiplying up and down movement of the float means 29. Further, the device 11 may include a deflector means 57 for covering the multiplying means 55 and any part of the gauge portion 33 of the float means 29 which extends above the top of the tube member 21 to protect the multiplying means 55 and the gauge portion 33 from the elements such as the wind. The deflector means 57 preferably consists of transparent cap-like member removably positioned on top of the flange member 51. The multiplying means 55 may include a lever means 59 pivotally attached to the deflector means 57 for being moved by the gauge portion 33 of the float means 29 in any manner apparent to those skilled in the art. A scale member 61 may be mounted on the deflector means 57 adjacent the end of the lever means 59 farthest from the pivot point thereof for allowing any up and down movement of the float means 29 to be indicated thereon.

The method of the present invention is quite simple and consists of the following steps: (1) filling the reservoir 13 with liquid until the level of the liquid rises into the tube member 21; (2) measuring any change in the level of the liquid in the reservoir 13 and tube member 21 over a period of time; and (3) measuring any change in the temperature of the liquid in the reservoir 13 over the same period of time that any change in the level of the liquid in the tube member 21 is measured. More specifically, after the reservoir 13 had been filled until the level of the liquid therein rises into the tube member 21, the guide sleeve means 43 is inserted into the tube member 21 and leveled and/or plumbed by way of the screw member 53. It should be noted that filling the reservoir 13 until the level of the liquid therein rises into the tube member 21 is a relatively normal situation and does not impose any unusual forces on the tank 15 which would cause the ends of the tank 15 to bulge out or the like which would be likely to result if the reservoir 13 was filled until the level of the liquid therein rose into a "stand pipe" or the like extending above the surface S. The thermistor element or elements 37 can then be lowered into the interior 19 of the tank 15 through the outer sleeve member 45 to thereby measure any change in the temperature of the liquid in the reservoir 13. The float means 29 can also then be floated on the surface of the liquid in the hollow tube member 21 by being inserted into the inner sleeve member 47 to indicate any change in the level of the liquid in the reservoir 13 and tube member 21. By comparing the change in temperature and change in level, it can be determined whether or not the reservoir 13 leaks. A more detailed description of the preferred method of detecting leaks of the present invention follows:

(a) The tank 15 is completely filled with product up into the tube 21 preferably 12 hours or more before test. The product is not to be disturbed (as, for example, by pumping product from the tank 15 in order to fill the tanks of vehicles) from the time of filling until test is completed. This "waiting" period will allow for substantial temperature stabilization and the establishment of a low temperature gradient between the product adjacent to the tank 15 and the tank 15 itself. Temperature changes during the test will thus be minimized. Product is not to be circulated by pumping before or during the test (the large temperature gradients usually created by circulating, as in certain prior procedures, result in excessive temperature changes during the test period).

(b) At time of test, the fill cap (not shown) of the tank 15 is removed and guide sleeve means 43 is inserted into the tube 21.

(c) Be certain that the product is well up into the tube 21 (at least 6" to 10") and into guide sleeve means 43 (add or remove small amounts of product, if necessary).

(d) Level and plumb the guide sleeve means 43.

(e) Insert float means 29.

(f) Install an above ground elevation reference device such as the lever means 59 and scale member 61 (level and plumb it, and orient it with guide sleeve).

(g) Calibrate the system in the following manner:
 1. Read the float elevation (e.g., determine how far above the surface S the gauge portion 33 extends).
 2. Add a known amount of product, e.g., 10 cu. inches into the tube 21.
 3. Read the float elevation again and calculate the change caused by the addition of the known amount of product. You will now have a basis for computing volume changes related to changes in elevation which might have occurred during the test.

(h) Insert a temperature sensing means such as the thermistor element 37 into the tank 15.

(i) Begin test,—determine temperature and level of product within the tank 15.

(j) Take readings again at end of test period. A one-hour test period would be reasonable. Intermittent readings should also be taken periodically.

(k) Calculate effective temperature change, if any, on volume of product. Relate the resulting change of volume to a resulting change of level in the tube 21. Compare this with the actual level change and calculate loss, if any. A loss equal to 11.5 cu. inches during the hour test period would be equal to 0.05 gallon, or equal to 1.2 gallons during a 24-hour period.

NOTE: The possible effects of changing water table outside the tank 15 must be taken into consideration, particularly of course, if there should be a leak in the tank 15 through which water could move. Measurement of water level (due to condensation and/or due to ingress from the outside through leak(s) in the tank 15, should also be taken when conditions warrant such action.

Although the invention has been described and illustrated with respect to the preferred embodiment, it is not to be so limited since changes and modifications may be made therein which are within the full intended scope of the invention.

I claim:

1. A method of detecting leaks in an underground liquid storage reservoir of the type including a hollow tank having a top portion located beneath the ground surface, and including one or more hollow tube members extending upwardly above said top portion of said tank and communicating the interior of said tank with said ground surface, the combined cross-sectional area of said tube members being greatly less than the cross-sectional area of the tank, said method comprising:
 (a) filling said reservoir with liquid until the level of the liquid rises into said tube members and is above said top portion of said tank and below said ground surface;
 (b) measuring any change in the level of the liquid in one of said tube members over a period of time; and
 (c) measuring any change in the temperature of the liquid in said reservoir over the same period of time that any change in the level of the liquid in said one of said tube members is measured.

2. The method of claim 1 in which any change in the level of the liquid in said one of said tube members over a period of time is measured by floating a buoyant member on the surface of the liquid in said one of said tube members and measuring any change in the elevation of said buoyant member over said period of time.

3. The method of claim 1 in which any change in the level of the liquid in said one of said tube members over a period of time is measured by floating a buoyant member having an upwardly extending gauge portion which extends above the top of said one of said tube members on the surface of the liquid in said one of said tube members and measuring any change in the amount of said gauge portion extending above the top of said one of said tube members over said period of time.

4. The method of claim 3 in which is included the step of inserting a guide sleeve into said one of said tube members for restricting any side-to-side movement of said gauge portion of said buoyant member and for reducing the cross-sectional area of the interior of said one of said tube members, said guide sleeve including an outer sleeve member for loosely fitting into said one of said tube members and including an inner sleeve member positioned within said outer sleeve member for slidably receiving at least a portion of said buoyant member.

5. The method of claims 2 or 3 in which is included the step of multiplying any movement of said buoyant member.

6. A device for detecting leaks in an underground liquid storage reservoir of the type including a hollow tank having a top portion located beneath the ground surface, and including one or more hollow tube members extending upward above said top portion of said tank and communicating the interior of said tank with said ground surface, the combined cross-sectional areas of said tube members being greatly less than the cross-sectional area of the tank, said device comprising:
  (a) indicator means for detecting and indicating any change in the level of the liquid in said tube members over a period of time, said indicator means including a float means for floating on the surface of the liquid in one of said tube members, said float means including an upwardly extending gauge portion for extending above the top of said one of said tube members and for indicating the level of the fluid in said one of said tube members;
  (b) temperature sensing means for indicating any change in temperature of the liquid in said reservoir over the same period of time that said indicator means indicates any change in the level of liquid in said tube members; and
  (c) a guide sleeve means for being positioned within said one of said tube members to reduce the cross-sectional area of said one of said tube members and to restrict any side-to-side movement of said float means, said guide sleeve means including an outer sleeve member for loosely fitting into said one of said tube members and including an inner sleeve member positioned within said outer sleeve member for slidably receiving at least a portion of said float means.

7. The device of claim 6 in which is included multiplying means for multiplying any up and down movement of said float means.

8. The device of claim 7 in which is included a deflector means for covering said multiplying means and any part of said gauge portion of said float means which extends above the top of said one of said tube members to protect said multiplying means and said part of said gauge portion from the elements.

9. The device of claim 8 in which said multiplying means includes a lever means pivotally attached to said deflector means for being moved by said gauge portion of said float means.

* * * * *